United States Patent Office 3,292,995
Patented Dec. 20, 1966

3,292,995
DEFLUORINATED PHOSPHATE MANUFACTURE
Otis W. Allen, Lakeland, Fla., assignor to International Minerals & Chemical Corporation, New York, N.Y., a corporation of New York
No Drawing. Filed Dec. 16, 1963, Ser. No. 330,594
4 Claims. (Cl. 23—108)

This invention relates to the defluorination of natural phosphate materials. More particularly, it relates to the manufacture of defluorinated phosphates useful as animal feed or animal feed supplement providing both needed phosphorus and calcium. Still more particularly, it relates to the manufacture of defluorinated phosphate rock.

Mineral phosphates of all the natural deposits in the United States and in most foreign countries occur in the form of apatite containing too much fluorine to permit their use as feed material without processing to reduce the content of objectionable fluorine from an original approximately 3.0 to about 3.8% to below about 0.1% in a phosphate feed containing about 30% $P_2O_5$.

In prior processes designed to reduce the fluorine content of ground natural phosphate rock to less than 0.1%, phosphate rock either alone or mixed with sulfuric acid, phosphoric acid, silica and the like have been calcined at temperatures ranging from 1800° F. to 2700° F.

It had previously been discovered that superior defluorination and improved citrate solubility of calcium phosphates could be obtained if the calcination of phosphate mixtures is carried out with a gaseous medium in contact with the agitating solids containing a volume percent of water vapor between the limits of approximately 5 and approximately 30%. In the process of this invention, phosphate rock and mole ratio balancing salts such as volatile anion salts of alkali metals are mixed with phosphoric acid so that in the final product the mole ratio represented by the following formula is between about 2.5 and 3.8.

$$\frac{\text{Moles}}{\text{Moles}} = \frac{CaO + MgO + Na_2O + K_2O - SO_3 - F_2}{P_2O_5 - Fe_2O_3 - Al_2O_3}$$

A detailed description of such prior art operations is contained in U.S. Patent No. 2,893,834 granted to Woodrow W. Richardson. It has been found that in the calcination of the blended solid and liquid ingredients balling sometimes occurs, with the result that large agglomerates of inadequately defluorinated product are formed. In the calcination, the temperature of the solids is controlled at the hot point so as to avoid fusion or melting of the feed, but permit adequate volatilization of fluorine and cause the $P_2O_5$ content of the mix to be produced in the alpha-tricalcium form. It has now been found that balling in the calciner is traceable to free sulfuric acid in the phosphoric acid employed in the preparation of the feed. It has further been found that balling can be reduced or eliminated by eliminating the free phosphoric acid content of the feed to the calciner.

It is an object of this invention to provide a method for the preparation of defluorinated phosphate rock mixtures by calcination in which balling of the product in the calciner is avoided. Other objects of this invention will become apparent from the following description.

Briefly, the method of this invention comprises neutralizing the free $SO_3$ content of the phosphoric acid employed in the preparation of the calciner feed to reduce the free $SO_3$ content of the phosphoric acid employed to less than 1.0% by weight. By "free $SO_3$" content is meant $SO_3$ in the form of sulfuric acid. The free sulfuric acid content of the phosphoric acid can be neutralized by employing a stoichiometric amount of calcium carbonate. The calcium carbonate is used in finely divided form, and is mixed with the phosphoric acid before blending the acid and solid constituents of the mix. This is most surprising since most phosphate rocks contain more than a stoichiometric amount of calcium carbonate, but such connate calcium carbonate has been found, for unknown reasons, not to prevent balling in the calciner.

The temperature of calcination will be in the range of 2500° F. to 2800° F., preferably 2650° F. to 2800° F. when the mole ratio set forth in the above equation is in the range of about 3.1 to 3.5. More preferred conditions are a mole ratio of 3.35 and a calcination temperature in the range of 2740° F. to 2790° F.

EXAMPLE

A Florida phosphate rock containing 35.1% $P_2O_5$ was ground to a size such that all of it passed through a 100 mesh standard screen. To 1,000 parts by weight of phosphate rock was added 91 parts by weight of sodium carbonate, and sufficient phosphoric acid of 54.4% $P_2O_5$ content to produce a product having a mole ratio, as determined from the foregoing equation, of 3.35. The resulting mixture was dried and comminuted so that all of the mix passed through a 20 mesh standard screen. The mix was calcined at a temperature of 2770° F. Air, having a relative humidity of 80%, was mixed with steam in quantities sufficient to raise the water content of the gaseous mixture to 10% of the total volume. This gaseous mixture was preheated before passage through the calciner. The residence time of the product at temperature in the calciner was about 45 minutes.

Part A

A calciner feed was prepared employing phosphoric acid having the following analysis:

| | Phos. acid "A" containing essentially dissolved $CaSO_4$ |
|---|---|
| Percent $P_2O_5$ | 54.4 |
| Percent $SO_3$ | 3.15 |
| Percent CaO | 1.6 |
| Percent free $SO_3$ | 0.86 |

The mix was treated in accordance with the afore-defined example conditions and very little trouble and very little balling or sticking of the mix in the calciner was noted.

Part B

A calciner feed was prepared using phosphoric acid having an analysis as follows:

| | Phos. acid "B" containing excess $SO_3$ |
|---|---|
| Percent $P_2O_5$ | 53.1 |
| Percent $SO_3$ | 3.5 |
| Percent CaO | 0.02 |
| Percent free $SO_3$ | 3.47 |

When a mix prepared employing phosphoric acid "B" was calcined, severe balling and sticking occurred in the calciner which resulted in serious production loss.

Part C

A third phosphoric acid was prepared by mixing 4.3 lbs. of calcium carbonate as ground limestone to each 100 lbs. of phosphoric acid "B." This amount of calcium carbonate is the stoichiometric quantity necessary to reduce the free $SO_3$ content of the phosphoric acid to substantially zero. A calciner feed was prepared using the calcium carbonate treated phosphoric acid, and subjected to the same calcination treatment. Very little trouble with balling or sticking was noted in the calcination, and the product loss due to balling and sticking was reduced to about the same level as noted for the phosphoric acid employed in Part A.

The embodiments of the invention in which an exclusive property or privilege is claimed are defined as follows:

1. In the production of a calcium phosphate animal feed ingredient containing less than 0.1% by weight of fluorine by mixing comminuted, fluorine-containing phosphate rock with salts of alkali metals and with phosphoric acid continuing free $SO_3$ in an amount in excess of 1% by weight of the phosphoric acid, and calcining the mixture at a temperature in the range of about 2500° F. to 2800° F., while agitating the mixture in contact with a gaseous atmosphere containing between about 5 and 30 volume percent of water vapor, the improvement comprising admixing with said phosphoric acid before said acid is mixed with phosphate rock finely divided calcium carbonate in an amount just sufficient to reduce the free $SO_3$ in said acid to about 0 to about 1% by weight of said acid, whereby balling of said mixture is avoided.

2. The method in accordance with claim 1 in which the quantities of phosphate rock, salts of alkali metals and calcium carbonate are adjusted so that the ratio represented by the following equation is in the range of 3.1 to 3.5

$$\frac{\text{Moles}}{\text{Moles}} = \frac{CaO + MgO + Na_2O + K_2O - SO_3 - F_2}{P_2O_5 - Fe_2O_3 - Al_2O_3}$$

and the temperature of calcination is in the range of 2650° F. to 2800° F.

3. The method in accordance with claim 2 in which the said ratio is about 3.35 and the temperature of calcination is about 2740° F. to 2790° F.

4. The method in accordance with claim 3 in which the amount of calcium carbonate added is about the stoichiometric equivalent of the free $SO_3$ in said phosphoric acid.

References Cited by the Examiner

UNITED STATES PATENTS

| | | | |
|---|---|---|---|
| 2,893,834 | 7/1959 | Richardson | 71—44 |
| 2,895,799 | 7/1959 | Le Baron et al. | 71—44 |
| 2,995,436 | 8/1961 | Hollingsworth et al. | 71—44 |
| 2,997,367 | 8/1961 | Williams | 71—44 |
| 3,107,145 | 10/1963 | Hinkle et al. | 71—44 |

DONALL H. SYLVESTER, *Primary Examiner.*

ANTHONY SCIAMANNA, *Examiner.*

H. R. CAINE, *Assistant Examiner.*